United States Patent
Garrard et al.

(10) Patent No.: US 10,240,548 B2
(45) Date of Patent: Mar. 26, 2019

(54) CONTROL SYSTEM AND METHOD OF OPERATING A CONTROL SYSTEM

(71) Applicants: Mike Garrard, Chelmsford (GB); Anoop K. Aggarwal, Bangalore (IN); William E. Edwards, Ann Arbor, MI (US); Philip Tobin, Huntersville, NC (US)

(72) Inventors: Mike Garrard, Chelmsford (GB); Anoop K. Aggarwal, Bangalore (IN); William E. Edwards, Ann Arbor, MI (US); Philip Tobin, Huntersville, NC (US)

(73) Assignee: NXP USA, Inc., Austin, TX (US)

( * ) Notice: Subject to any disclaimer, the term of this patent is extended or adjusted under 35 U.S.C. 154(b) by 514 days.

(21) Appl. No.: 14/905,205

(22) PCT Filed: Jul. 23, 2013

(86) PCT No.: PCT/IB2013/056027
§ 371 (c)(1),
(2) Date: Jan. 14, 2016

(87) PCT Pub. No.: WO2015/011523
PCT Pub. Date: Jan. 29, 2015

(65) Prior Publication Data
US 2016/0160780 A1 Jun. 9, 2016

(51) Int. Cl.
*F02D 41/22* (2006.01)
*B60R 16/023* (2006.01)
(Continued)

(52) U.S. Cl.
CPC ............ *F02D 41/22* (2013.01); *B60R 16/023* (2013.01); *G05B 15/02* (2013.01); *G07C 5/006* (2013.01);
(Continued)

(58) Field of Classification Search
None
See application file for complete search history.

(56) References Cited

U.S. PATENT DOCUMENTS 5,745,048 A  4/1998  Taguchi et al.
6,006,150 A * 12/1999  Ueda ............... B60W 30/18
                                                    180/336
(Continued)

FOREIGN PATENT DOCUMENTS

EP  2 130 723 A1  12/2009
JP  11-249732      9/1999
(Continued)

OTHER PUBLICATIONS

ETAS; "ES500 ECU & Bus Interface Modules"; retrieved from the internet http://www.etas.com/en/products/es585_k_line_interface_centronics.php on Apr. 1, 2016; 1 page (Apr. 2016).
(Continued)

*Primary Examiner* — Jonathan M Dager

(57) ABSTRACT

An electronic control unit suitable for a motorcycle provides diagnostic support, tachometer drive and warning lamp drive all multiplexed onto one pin and driven by a single driver circuit. In a diagnostics mode, the pin is connected to diagnostic equipment. When a diagnostic test has been completed, a tachometer drive signal is output on the pin, the drive signal having a duty cycle set high enough to illuminate the warning lamp if a fault condition is detected by on-board sensors. By combining multiple functions onto a single pin with a single driver circuit, the cost of implementing an engine control unit may be reduced compared with existing arrangements which require separate pins and drivers for each function.

15 Claims, 3 Drawing Sheets

(51) Int. Cl.
 *G05B 15/02* (2006.01)
 *G07C 5/00* (2006.01)
 *F02D 41/28* (2006.01)
(52) U.S. Cl.
 CPC ........ *F02D 41/28* (2013.01); *F02D 2041/228* (2013.01); *Y02T 10/40* (2013.01)

(56) References Cited

U.S. PATENT DOCUMENTS

| | | | |
|---|---|---|---|
| 6,321,127 B1* | 11/2001 | Kondo | F02D 41/266 340/3.43 |
| 7,225,065 B1* | 5/2007 | Hunt | B60R 16/0207 701/33.2 |
| 7,904,219 B1* | 3/2011 | Lowrey | G01C 21/26 701/32.3 |
| 9,020,661 B2* | 4/2015 | Sugihara | B60W 50/0098 701/2 |
| 2002/0116559 A1* | 8/2002 | Hoffman | G06F 13/385 710/64 |
| 2004/0111188 A1* | 6/2004 | McClure | B60W 50/04 701/1 |
| 2006/0108956 A1* | 5/2006 | Clark | B60L 3/108 318/139 |
| 2010/0174576 A1* | 7/2010 | Naylor | G06Q 10/04 701/31.4 |
| 2011/0072176 A1* | 3/2011 | Hsu | H04L 12/4135 710/110 |
| 2013/0066514 A1* | 3/2013 | Das | G07C 5/008 701/31.5 |
| 2017/0140349 A1* | 5/2017 | Ricci | G06Q 20/102 |

FOREIGN PATENT DOCUMENTS

| | | |
|---|---|---|
| JP | 2007223451 A | 9/2007 |
| JP | 2011121545 A | 6/2011 |
| JP | 2012-206551 A | 10/2012 |

OTHER PUBLICATIONS

Freescale Semiconductor; Technical Data 33814—Small Engine Control IC—Rev 1.; 42 pages (Jun. 29, 2011).
International Search Report for Application PCT/IB2013/056027 (dated Apr. 1, 2014).

* cited by examiner

CONTROL SYSTEM AND METHOD OF OPERATING A CONTROL SYSTEM

FIELD OF THE INVENTION

This invention relates to a control system for controlling a machine and a method of operating such a control system.

BACKGROUND OF THE INVENTION

This invention is particularly applicable, though not exclusively so, to electronic control systems for single-cylinder-engined motorcycles. Forthcoming legislation relating to permitted exhaust emission levels for these vehicles is driving a transition from discrete ignition and carburetor designs towards microcontroller-based ignition and fuel injection. This increased use of electronics brings with it complexity, including the complexity of calibration, which for fuel injection is several hundred parameters as opposed to a handful of mechanical parts on a carburetor. In addition, expensive calibration equipment, which in many cases can only be operated by trained personnel, is required. Thus it would be advantageous to provide a simple electronic solution whereby calibration could be performed using a laptop computer and without requiring software skills.

Some vehicle manufacturers integrate a diagnostics communication link into their electronic engine control units. This new complexity is often beyond the capabilities of a local repair shop, but a typical engine control unit can be programmed to diagnose both itself and the vehicle's on-board sensors and actuators which are connected to it and thereby report faults to the repairer Certain emissions standards also require fault reporting by way of a vehicle-mounted malfunction indicator lamp.

Thus the manufacturing industry for about 40 million motorcycles worldwide needs to update their engine controls over the next five to ten years to include a microcontroller, calibration, diagnostics interface, and fault lamp.

The Freescale 33813 engine control unit, described in Freescale Document number MC33813 Rev. 1.0, 8/2012, provides a tachometer drive output pin, a lamp drive output pin and a bidirectional line output for providing diagnostic support to an associated microcontroller. Each of these three functions requires a separate pin and separate driver, however, thus adding complexity and cost to the components required for engine management compared with pre-legislation designs.

SUMMARY OF THE INVENTION

The present invention provides a control system for controlling a machine and a method for operating a control system for controlling a machine as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
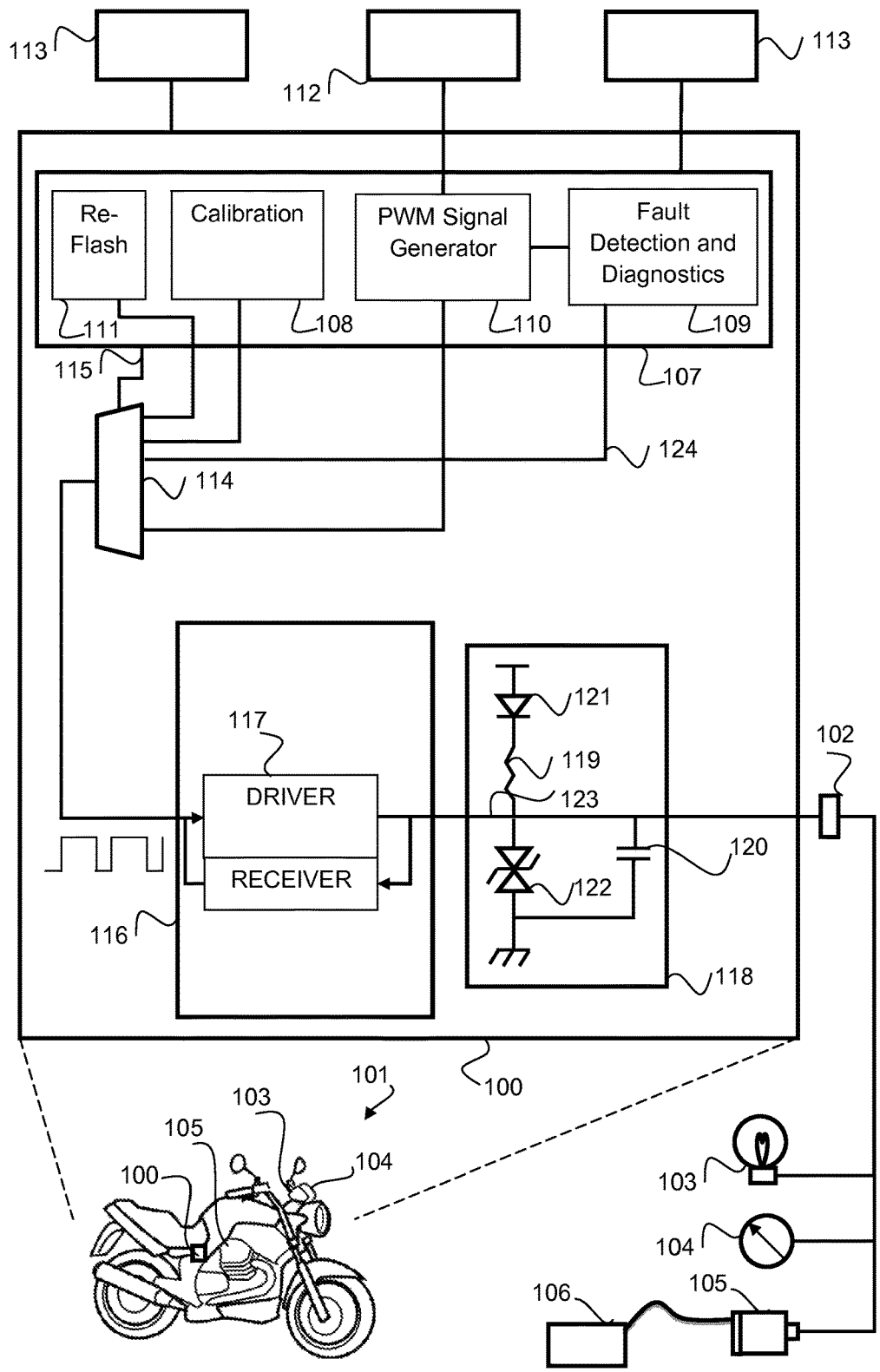
FIG. 1 is a simplified block diagram of an example of a control system.

With reference to FIG. 1, a control system for controlling a machine is illustrated schematically at 100. The system 100 may be implemented in one or more integrated circuits. In this example, the functionality of the control system is represented by discrete modules and exemplary circuit components. However, it will be appreciated that other configurations are possible.

In this example the control system 100 may comprise an electronic control unit 100 and form at least a part of a vehicle control system (for example, an engine control system) for a motorcycle 101. In such an example of use, the electronic control unit 100 is located underneath a seat of the motorcycle so that it may be protected from adverse weather conditions. The electronic control unit 100 is provided with an pin 102. Connections may be provided between this pin 102 and a warning lamp 103, a tachometer 104 and a diagnostics connector 105, all of which may be located on the motorcycle 101. The diagnostics connector 105 may be secured in an accessible location on the motorcycle so that any computing equipment, for example, diagnostics and calibration equipment, such as a laptop computer 106, may be plugged into the connector 105.

In this exemplary embodiment the electronic control unit 100 includes a microcontroller 107 which in this example, may comprise a calibration module 108, a fault detection and diagnostics module 109, a pulse width modulated signal generator 110, arranged to generate a pulse width modulated (PWM) signal of variable pulse width, and a flash re-programming (or "re-flash") module 111. The PWM signal generator 110 may receive an input from a sensor 112 which may provide a pulse for every revolution of the engine of the motorcycle 101. Typically, the PWM signal generator 110 may produce a signal suitable for driving the tachometer 104 using the edges occurring at regular crank intervals, such as, once per revolution, while the engine of the motorcycle is running.

The microcontroller 107 may be connected to several more on-board sensors 113 which may be positioned at various convenient locations on the motorcycle 101 and provide an indication of the status of the motorcycle's engine and ancillary equipment. Such sensors may for example sense air pressure, engine temperature, fuel pressure, charging current, etc. The outputs of the sensors 113 may be received by the fault detection and diagnostics module 109.

The electronic control unit 100 is further provided, in this example, with a selector module 114. This selector module may be any type of suitable digital or analog device or switch which may select between an output from any of the four modules 108, 109, 110, 111 according to a signal on line 115 which is received by the selector module and generated by the microcontroller 107. An output of the selector module 114 may be operably coupled to an input of a bi-directional signal conditioning module 116. In this example, the signal conditioning module comprises a bi-directional driver/receiver 117 which may be operably coupled to a pull-up circuit 118.

In one simplified embodiment, the signal conditioning module 116 may comprise a single low side driver which may be operably coupled to a pull up resistor 119. Communications transmissions speeds may be set by the resistor 119 and an electrostatic discharge protection capacitor 120, the latter being coupled between an output of the low side driver and ground. Alternatively a half bridge driver containing both high side and low side transistors may be employed in order to achieve high speeds, for example.

In the example shown in FIG. 1, the pull up circuit 118 may comprise a pull-up resistor 119 which pulls the input up to a voltage, V, via a diode 121. A protection circuit may be also provided and may comprise a transient voltage suppression diode 122 connected in parallel with an electrostatic discharge protection capacitor 120 and connected between an input signal line 123 of the pull-up circuit 118 and ground. An output of the signal conditioning circuit 116 may be operably coupled to the pin 102.

In general, the signal conditioning circuit may take a variety of suitable known forms of driver and pull-up circuit. The configuration shown in FIG. 1 may be particularly suitable for a k-line master device. For a slave device, the pull-up circuit may comprise a simple high pull up resistor (30,000 Ohms, for example) to a positive voltage level (12 V for example), with the diode 121 being omitted.

In an alternative embodiment, the signal conditioning module 116 may comprise a low side driver circuit and a programmable high side driver circuit, the latter circuit being controllable by the microcontroller 107. With this alternative embodiment, the selector module 114 would also control the high side driver to be on or off such that the output of the signal conditioning module 116 (connected to the pin 102) could be either just low side, or both high and low side (that is, a totem pole output), as appropriate for the module 108, 109, 110, 111 that is selected at the time A purpose of the signal conditioning module 116 is to provide sufficient drive current and voltage so that signals generated by each module 108, 109, 110, 111 of the microcontroller 107 are sufficient to drive the warning lamp 103, the tachometer 104 or calibration equipment 106 as appropriate.

Referring again to the specific example of FIG. 1, a link 124 from the fault detection and diagnostics module 109 through the selector module 114 and the signal conditioning module 116 to the pin 102 may be a bidirectional communications link. Such a bidirectional communications link may be a ISO (International Standards Organisation) 9141 K line diagnostics link. ISO 9141 relates to diagnostics systems for road vehicles and the interchange of digital information. It specifies the requirements for setting up the interchange of digital information between on-board electronic control units and suitable diagnostic test equipment which is needed for the inspection, testing and adjustment of vehicles. In one example, the link 124 from the fault detection and diagnostics module 109 to the selector module 114 may come from a serial port (UART) of the microcontroller 107. In one example, the PWM signal generated by the PWM signal generator module 110 may be output from a timer channel of the microcontroller 107.

The outputs from on-board sensors 113 may be monitored by the fault detection and diagnostics module 109 which may be arranged to detect any fault and generate a fault detection signal which it feeds to the PWM signal generator 110. In one example, the PWM signal generator 110 may be arranged to vary the duty cycle of the PWM signal. It may, for example, set the pulse width to a first value if an output received from the fault detection module 109 indicates that a fault is present and set the pulse width to a second value if the fault detection module determines that no fault is present. In general, if a fault is present, the PWM signal generator module is arranged to generate a tachometer signal at its output such that the tachometer signal appearing on the pin 102 has a duty cycle sufficient to illuminate the warning lamp 103. Conversely, when there is no fault, the PWM signal generator module is arranged to generate a tachometer signal at its output such that the signal appearing on the pin 102 has a duty cycle insufficient to illuminate the warning lamp 103.

It will be noted that in some driver arrangements, an inversion of the input signal may occur, in which case a signal with a low duty cycle being input into the driver module 117 may appear at the driver module's output on line 123 as a signal having a high duty cycle.

Say for example that the motorcycle's engine is running at 800 rpm and a fault has been detected. As a consequence, the PWM signal generator 110 sets its output signal to have a repetition rate of 800 pulses per minute with a duty cycle of 95%. This signal appears at the pin 102 when the selector module 114 is instructed by the microcontroller 107 to selectively feed the output of the PWM signal generator module 110 to the input of the signal conditioning module 116. This signal may be received by the warning lamp 103 and the tachometer 104. In response, the tachometer 104 will display an engine speed of 800 revolutions per minute. Furthermore, the 95% duty cycle of the signal is high enough to illuminate the warning lamp and without any visible flicker, owing to the brevity of off-time and the thermal inertia of the lamp. Therefore, the fault condition which had been detected by the fault detection module 109 will be announced to the rider. In another example, where no fault is detected, the duty cycle of the PWM signal may be set to be, say 5%. Once again, when the signal arrives at the pin 102 it may be received by the warning lamp 103 and the tachometer 104. The tachometer 104 will respond to the repetition rate of the pulsed signal but this time, the lower duty cycle of the signal will be insufficient to illuminate the warning lamp 103.

Other known arrangements for the signal conditioning circuit 116 may be suitable. The limit on the low side current capability is the ability to drive the warning lamp 103. If this is an incandescent bulb then it will have an inrush current of perhaps one amp and around two hundred milliamps running current. If the fault lamp is an LED then the running current is under 20 mA, which is close to that required for both the tachometer 104 and standard communications protocols. For ISO9141, the communications are slow, typically 10k baud/bits per second, and a single low side driver along with a pull up resistor is sufficient. The driver itself is likely to be faster and for communications where this is advantageous, such as calibration and re-flashing (reprogramming), the capacitor 120 may be reduced in value or a totem pole driver may be implemented. The standard K-line is a 12 V signal. Tachometer signals are also usually 12 V.

It will be appreciated from the above description that one exemplary embodiment may permit multiplexing a tachometer signal with a communications function. Another example may permit multiplexing a fault lamp signal with a communications function. It will be further appreciated that further embodiments permit multiplexing a fault lamp signal, a tachometer signal and (in the time domain), a communications link, all on one pin of a control unit. Advantageously, by combining multiple functions onto a single pin with a single driver circuit, the cost of implementing an engine control unit may be reduced compared with existing arrangements which require separate pins and drivers for each function. A further drawback of current systems which the invention overcomes derives from the practice of potting electronic control units in resin in order to ensure that they are waterproof and robust. With known systems, if a calibration error is made during manufacture and only discovered after the unit is potted, the mistake cannot be rectified and a faulty unit will have to be scrapped. However one embodiment described herein provides for reprogramming an engine control unit over a pin that is present on a front connector after the unit has been potted.

Figure 2:
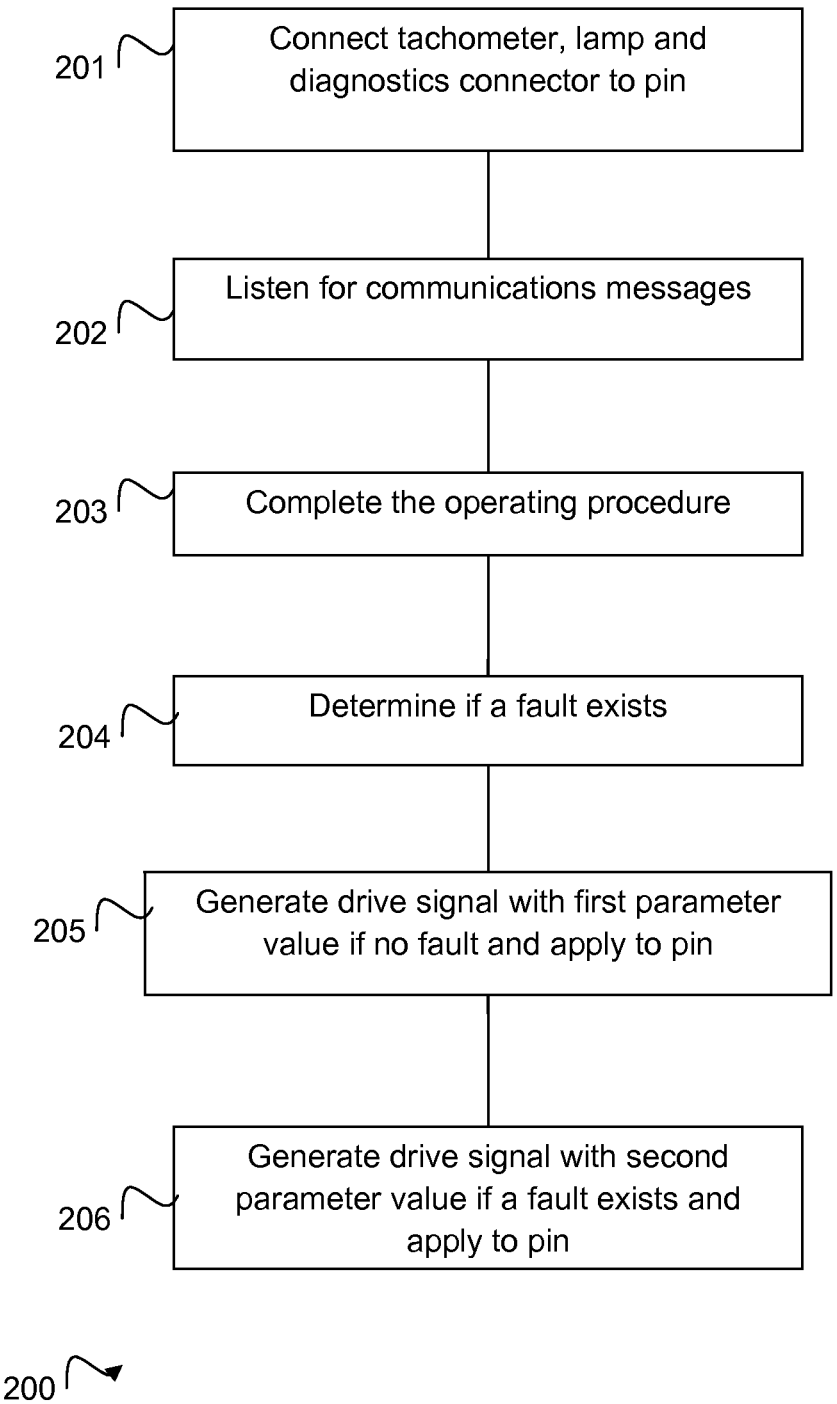
FIG. 2 is a simplified flowchart illustrating a first exemplary method of operating a control system.

A first example of a method for operating a control system will now be described with reference to FIG. 2 which is a simplified flowchart illustrating an exemplary method 200 of operating a control system. The method may be used on a control system for controlling a machine such as a motorcycle.

In the specific example of controlling a motorcycle, at 201, a tachometer, a warning lamp and a diagnostics connector all of which are located on a motorcycle, are connected up to a pin of the control system. Re-flashing, calibration or diagnostic equipment may be operably coupled to the diagnostics connector and the control system may be powered up by switching on the ignition of the motorcycle.

At 202, the control system listens via the pin and the diagnostics connector for any communications messages which may be sent by the diagnostic equipment.

Such communications messages may include an instruction for the control system to carry out an operating procedure. Such an operating procedure may be a calibration procedure or a diagnostics procedure, for example.

If such a message is received then at 203 the control system completes the operating procedure in accordance with the instructions.

On completion of the instructed operating procedure or if no communications messages were received within a predetermined time period, then at 204 the control system determines if any fault exists. Such a fault may comprise faulty operation of any sensors, actuators or electronic controllers, for example, which comprise the motorcycle.

If no fault is detected, then at 205, a drive signal having a first parameter value is generated and applied to the pin. In the specific example of the motorcycle, the drive signal may be a pulse width modulated signal having a pulse repetition rate equal to the engine speed and having a variable duty cycle. In the case where no fault is detected the duty cycle may be set comparatively low. When the signal is received by the tachometer, the tachometer registers the speed of the engine. The signal is also received by the warning lamp, which, because the duty cycle is low, does not illuminate.

Figure 3:
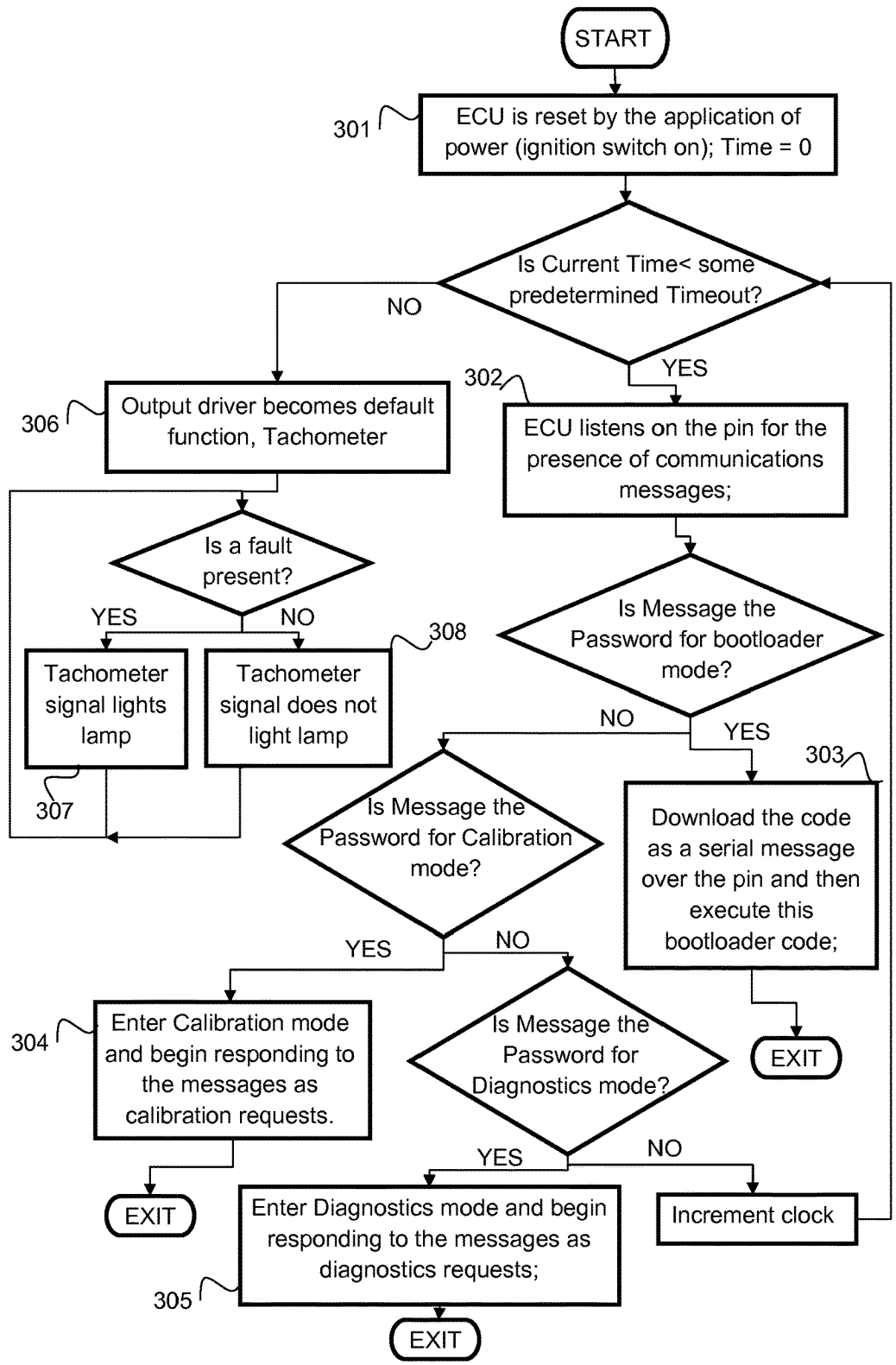
FIG. 3 is a simplified flowchart of a second exemplary method of operating a control system.

If a fault is detected, then at 206, a drive signal having a second parameter value is generated and applied to the pin. In the specific example of the motorcycle, the drive signal may be a pulse width modulated signal having a pulse repetition rate equal to the engine speed and having a variable duty cycle. In the case where a fault is detected the duty cycle may be set comparatively high. When the signal is received by the tachometer, the tachometer registers the speed of the engine. The signal is also received by the warning lamp, which, because the duty cycle is high, causes the warning lamp to illuminate A second example of a method for operating a control system will now be described with reference to FIG. 3 which is a simplified flowchart illustrating an exemplary method 300 which may be used to operate the electronic control unit 100 of FIG. 1 which may be used on a control system for controlling a machine such as a motorcycle.

At 301, the electronic control unit (ECU) 100 is reset by the application of electrical power (for example by switching on the ignition of the motorcycle). The resetting procedure includes the generation of a control signal (on line 115) by the microcontroller 107 which commands the selector module 114 to select the bidirectional communications link 124 for application to the pin 102 (via the signal conditioning module 116). Also at this point, a clock is set running.

At 302, the electronic control unit listens for the presence of communication messages via the pin 102 whilst the clock is running. In this example, the pin 102, in addition to being connected to a tachometer and a warning lamp of the motorcycle, may be connected through the motorcycle's on-board diagnostics connector to re-flashing, calibration or diagnostics equipment. Conveniently, the re-flashing, calibration and/or diagnostics equipment may comprise a personal computer running an appropriate tool and using a simplex RS232 serial communications link with a simple converter to the ISO 9141 physical interface.

If the electronic control unit detects a communications message comprising, for example, a password for a bootloader mode, then at 303, the electronic control unit downloads bootloader code from the personal computer as a serial message via the pin and subsequently executes the boot loader code. Herein, the term bootloader code means a piece of code that is executed once a system is booted and a common use of such code is to re-program the electronic control unit.

If the electronic control unit detects a communications message comprising a password relating to a calibration mode, then at 304, the calibration mode is entered and the communications electronic control unit commences to respond to the messages received from the personal computer via the pin as calibration requests and in accordance with conventional techniques.

If the electronic control unit detects a communications message comprising a password relating to a diagnostics mode, then at 305, the diagnostics mode is entered and the electronic control unit commences to respond to the messages received from the personal computer by the pin as diagnostic requests and in accordance with conventional techniques.

In one example, a boot loader mode of operation has priority over a calibration mode of operation which in turn has priority over a diagnostic mode of operation. However, different orders of priority may be set.

Note that although the pin 102 is connected to the tachometer 104 and the warning lamp in addition to the personal computer 106, the tachometer and warning lamp are not able to respond to any diagnostic messages which the diagnostics and calibration module 108 may send to the pin If no communications messages are received, the clock may be incremented and the electronic control unit may cease to listen for any further messages once the clock has timed out. Similarly, once all received instructions have been executed, the electronic control unit ceases to listen for any more messages. On cessation of the listening procedure, at this point, the microcontroller 107 may generate a control signal on line 115 which now commands the selector module 114 to select the output of the PWM signal generator module 110 for application to the pin 102 (via the signalling conditioning module 116) in place of the bidirectional communications link 124.

Hence at 306, the signal conditioning module 116 may output a tachometer drive signal which is the default function of the driver module 117. A tachometer drive signal may be a pulse width modulated signal of variable duty cycle depending on whether or not a fault has been detected.

If a fault is present, then at 307 a PWM signal having a duty cycle sufficiently large enough to illuminate the warning lamp 103 appears on the pin.

If a fault is not present then 308, a PWM signal having a duty cycle so low that the warning lamp will not be illuminated appears at the pin.

The electronic control unit may continue in this mode of operation where a tachometer signal of varying duty cycle is applied to the pin until the motor cycle's ignition is switched off and switched on again whereupon a communications link between the diagnostics and calibration module 108 and the pin is re-established and the tachometer signal is (temporarily) removed by the action of the selector module 114.

Different embodiments which use the same basic principles but different signal coding schemes are possible. For example, diagnostics or calibration messages might be sent at the rate of one per tachometer signal, thus conveying the tachometer information using whole bytes or messages rather than single pulses. By way of an example, at a speed of 12,000 rpm, the tachometer need only received one edge every 5 ms and thus can ignore subsequent edges arriving at a faster rate or edges for an appropriate period of time such as 1 ms. Using a data rate of 115 kBaud, a one byte message takes under 80 µs. Thus a single or multiple bytes of data could be sent at the rate of tachometer messages, thereby allowing communications to occur simultaneously to tachometer operation.

While the specific embodiments have been described in the context of a control system for a motorcycle, it will be understood that the applicability of the invention is not so-limited. For example, the invention may also find application with motor cars and motorised hand tools, for example lawn mowers, lawn trimmers, chain saws.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

In the foregoing specification, the invention has been described with reference to specific examples of embodiments of the invention. It will, however, be evident that various modifications and changes may be made therein without departing from the broader spirit and scope of the invention as set forth in the appended claims. For example the discrete modules shown in FIG. 1 are so shown for illustrative purposes and the functionality of each module may be combined with one or more other modules. For example, the driver module 117, selector module 114 and pull-up circuit 118 of FIG. 1 may be implemented in an ASIC (application specific integrated circuit). As a further example, the PWM signal generator module 110 may be included in such an ASIC device rather than in the microcontroller 107.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the modules shown in FIG. 1 may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method for controlling a machine having a first device and a second device, using a single pin from a control device, the method comprising;
   generating a drive signal having a frequency parameter and a duty cycle parameter,
   wherein the first device is responsive to the frequency parameter and the second device is responsive to the duty cycle parameter;
   determining whether or not a fault condition in the machine exists, and
   if a fault condition exists, setting the duty cycle parameter of the drive signal to a first duty cycle value and applying the drive signal to the single pin, and
   if no fault is detected, setting the duty cycle parameter of the drive signal to a second duty cycle value and applying the drive signal to the single pin.

2. The method of claim 1
   wherein the drive signal is a pulse width modulated signal;
   wherein the duty cycle parameter is a pulse width of the pulse width modulated signal; and
   wherein the first device is a tachometer responsive to the frequency of the pulse width modulated signal; and
   wherein the second device is a warning lamp having an illumination controlled by the duty cycle of the pulse width modulated signal.

3. The method of claim 1:
   wherein if the fault exists, setting the duty cycle parameter to a value such that a light is visibly illuminated.

4. The method of claim 1 further comprising
   determining a presence on the single pin of a communications message including an instruction to execute an operating procedure, and
   if the communications message is detected, completing the operating procedure before generating the drive signal.

5. The method of claim 4 further comprising
   operably coupling the single pin to a computing device.

6. The method of claim 5 further comprising
   receiving at the single pin, a communications message from the computing device, said message including a bootloader instruction, and
   executing said bootloader instruction in the control device.

7. The method of claim 5 further comprising
   receiving at the single pin, a communications message from the computing device, said message including a calibration instruction, and
   executing said calibration instruction in the control device.

8. The method of claim 5 further comprising
receiving at the single pin, a communications message from the computing device, said message including a diagnostics instruction, and
executing said diagnostics instruction in the control device.

9. A control device for controlling a machine, having a first device and a second device, and for providing multiple control functions on a single pin of the control device,
wherein the control device comprises
a controller arranged to generate a drive signal, having a frequency parameter and a duty cycle parameter;
wherein the first device is responsive to the frequency parameter and the second device is responsive to the duty cycle parameter;
wherein the controller is arranged to detect a fault condition; and
wherein the drive signal has a duty cycle parameter which is varied depending on whether or not the fault condition is detected.

10. The control device of claim 9:
wherein the drive signal comprises a pulse width modulated signal and
wherein the controller is arranged
to set the pulse width to a first duty cycle value if the fault condition is detected and
to set the pulse width to a second duty cycle value if the fault condition is not detected.

11. The control device of claim 9
wherein the controller is arranged to transmit and receive at least one diagnostics message to and from the machine via the single pin.

12. The control device of claim 9 comprising
a communications link arranged between the controller and the single pin
wherein said communications link comprises a bidirectional ISO 9141 K line diagnostics link.

13. The control device of claim 9
wherein the control device is implemented in one or more integrated circuit devices.

14. A vehicle comprising the control device of claim 9.

15. The control device of claim 9:
wherein the control device is configured to determine the presence on the single pin of a communications message including an instruction to execute an operating procedure and to complete an operating procedure in accordance with the communications message before generating the drive signal.

* * * * *